(12) United States Patent
Bowie (10) Patent No.: US 12,209,698 B2
(45) Date of Patent: Jan. 28, 2025

(54) PIPELINE ISOLATION TOOL, ASSEMBLY AND METHOD

(71) Applicant: STATS (UK) Limited, Aberdeen (GB)

(72) Inventor: Angus Bowie, Alloa (GB)

(73) Assignee: STATS (UK) Limited, Aberdeen (GB)

( * ) Notice: Subject to any disclaimer, the term of this patent is extended or adjusted under 35 U.S.C. 154(b) by 214 days.

(21) Appl. No.: 17/636,190

(22) PCT Filed: Aug. 17, 2020

(86) PCT No.: PCT/GB2020/051966
§ 371 (c)(1),
(2) Date: Feb. 17, 2022

(87) PCT Pub. No.: WO2021/032967
PCT Pub. Date: Feb. 25, 2021

(65) Prior Publication Data
US 2022/0290793 A1 Sep. 15, 2022

(30) Foreign Application Priority Data
Aug. 18, 2019 (GB) ...................................... 1911837

(51) Int. Cl.
*F16L 55/124* (2006.01)
*F16L 55/132* (2006.01)
(Continued)

(52) U.S. Cl.
CPC ........... *F16L 55/124* (2013.01); *F16L 55/132* (2013.01); *F15B 18/00* (2013.01); *G01M 3/005* (2013.01)

(58) Field of Classification Search
CPC .. F15B 11/0365; F15B 15/1466; F15B 18/00; F15B 20/004; F16L 55/105;
(Continued)

(56) References Cited

U.S. PATENT DOCUMENTS 2,577,462 A * 12/1951 Hackney ............. F15B 15/1466
91/181
3,385,172 A * 5/1968 Syivan ................ F15B 11/0365
92/61
(Continued)

FOREIGN PATENT DOCUMENTS

EP 2320120 7/2018

OTHER PUBLICATIONS

International Preliminary Report on Patentability for International Patent Application No. PCT/GB2020/051966 dated Mar. 3, 2022.
(Continued)

*Primary Examiner* — Kenneth Rinehart
*Assistant Examiner* — Richard K. Durden
(74) *Attorney, Agent, or Firm* — Carlson, Gaskey & Olds, P.C.

(57) ABSTRACT

An isolation tool assembly for isolating a section of pipe includes a launcher, an adapter arrangement and an isolation tool. The launcher is configured to deploy and/or retrieve the isolation tool through a single opening in a wall of the pipe. The adapter arrangement is configured to couple a housing of the launcher to the pipe and a piston and a yoke of the launcher to the isolation tool via a linkage arrangement. The isolation tool includes a seal unit in the form of a seal module including annular primary and secondary seal elements. The seal module reconfigurable from a first configuration to a second, axially retracted, configuration, and movement of the seal module to the second, axially retracted, configuration urges the seal elements towards the wall of the pipe to isolate the section of pipe. The isolation tool includes a secondary activation arrangement configured to apply a force on an activating member of the primary activation arrangement to maintain the seal unit in the second configuration and maintain the isolation.

18 Claims, 4 Drawing Sheets

(51) Int. Cl.
*F15B 18/00* (2006.01)
*G01M 3/00* (2006.01)

(58) Field of Classification Search
CPC ... F16L 55/124; F16L 55/1283; F16L 55/132; F16L 55/134
See application file for complete search history.

(56) References Cited

U.S. PATENT DOCUMENTS

| | | | | |
|---|---|---|---|---|
| 3,626,475 | A * | 12/1971 | Hicks | F16K 51/00 138/94 |
| 4,296,677 | A * | 10/1981 | Little | F15B 15/1466 92/108 |
| H541 | H * | 11/1988 | Childress | F15B 11/0365 92/170.1 |
| 7,841,364 | B2 * | 11/2010 | Yeazel | F16L 55/132 138/91 |
| 8,307,856 | B2 * | 11/2012 | Yeazel | F16L 55/1283 138/92 |
| 8,714,515 | B2 * | 5/2014 | Nannan | F16K 31/122 137/553 |
| 9,027,602 | B2 * | 5/2015 | Bowie | F16L 55/124 137/15.08 |
| 9,057,447 | B2 * | 6/2015 | Bowie | F16L 55/132 |
| 2008/0017390 | A1 * | 1/2008 | Bowie | G01M 3/2853 166/123 |
| 2021/0009253 | A1 * | 1/2021 | Lassalle | B64C 11/38 |
| 2021/0040962 | A1 * | 2/2021 | Ito | F15B 15/1428 |

OTHER PUBLICATIONS

International Search Report and Written Opinion for International Patent Application No. PCT/GB2020/051966 dated Feb. 25, 2021.
Search Report for United Kingdom Patent Application No. 1911837.1 dated Jul. 24, 2020.

* cited by examiner

PIPELINE ISOLATION TOOL, ASSEMBLY AND METHOD

REFERENCED TO RELATED APPLICATIONS

This application is a United States National Phase application of PCT Application No. PCT/GB2020/051966 filed on Aug. 17, 2020, which claims priority to United Kingdom Application No. 1911837.1 filed on Aug. 18, 2019.

FIELD

This relates to a pipeline isolation tool, assembly and method for use in isolating a section of a pipe transporting fluids such as oil, gas or the like.

BACKGROUND

The oil and gas industry has for many years used hot tapping and line stopping techniques in order to provide localized isolation of a "live" section of pipe.

Hot tapping involves the fitting of a branch or tee connection to a live pipeline containing fluid at pressure. The connection may be welded or mechanically secured to the pipe, a valve being subsequently fitted to the connection. A tapping or drilling tool is then connected to the valve, the tapping tool being activated to pass through the open valve and drill through the pipe wall to create the branch. The tapping tool is configured to prevent leakage of fluid from the pipe during the pipe cutting operation. On completion of the drilling process, the tapping tool may be removed and the valve closed to complete the branch connection. Thus, fluid may be selectively directed via the branch connection. Alternatively, or in addition, tools may be inserted and/or removed via the hot tap connection to perform a variety of tasks within the pipe.

Conventionally, where pipe isolation is required, a plug or line stop tool including a lip seal is inserted through the hot tap connection to provide unidirectional sealing isolation of the pipe inboard, or downstream, of the line stop tool. In order to apply a test pressure to test the integrity of the line stop seal a second opening is cut into the pipe at a location outboard, or upstream, from the first opening and a second barrier put in place. A smaller third opening is drilled between the first and second openings to pressurize the isolated area between the first and second barriers, and thus vent the leak past the primary lip seal. If a second full pressure barrier is required, then two of these lip seals are deployed through separate fittings and an open vent is used to ensure no pressure between the barriers. Although a confidence leak test can be performed, the unidirectional nature and sealing capacity of these seals would only result in proof of the relative leak rates. Thus, although two pressure-tested seals have been provided, only one, the primary seal, is effective against the isolated pressure. In addition, each intervention into the pipe requires additional planning, setup and operation time resulting in increased costs for the operator. As such, traditional lip seal arrangements do not meet current isolation standards.

The BISEP™ family of double block and bleed hot tap installed isolation devices from STATS (UK) Limited can be installed through a single hot tap penetration and include a rotatable seal unit in the form of a spherical or globe seal module. The seal module carries a pair of seal elements and is configured such that the pressure differential acting across the seal module further energises the seal elements. Thus, in the event of a failure of the external seal activation, isolation of the pipeline is maintained. Moreover, an annular chamber between the seal elements may be pressurized to confirm the integrity of both seal elements.

The BISEP™ seals are dual direction compression seals which allow the annulus to be raised above the pipeline pressure so validating that the leak tests on both seals are independent and can't be fed from the pipeline pressure. These seals are also anticipated to provide leak tight sealing, even if there is no differential pressure to energise them.

In some configurations, the BISEP™ is deployed so as to isolate upstream of the hot tap penetration which is ideal for high pressure applications and provides access to the isolated section of the pipeline via the device's launcher vents.

In other configurations, the BISEP™ is deployed so as to isolate downstream of the penetration, facilitating a bypass through the same single hot tap penetration through which the BISEP™ is deployed.

SUMMARY

According to a first aspect, there is provided an isolation tool for use in isolating a section of a pipe, the isolation tool including a seal unit configured for location in a section of a pipe via a single opening in the wall of the pipe. The seal unit includes a seal arrangement configured to engage the wall of the pipe to isolate the section of the pipe, and the seal arrangement is self-energized by the isolated pressure differential across the seal unit. The seal unit is reconfigurable from a first, axially extended, configuration to a second, axially retracted, configuration, and movement of the seal unit to the second, axially retracted, configuration urges the seal arrangement towards the pipe wall so as to isolate the section of the pipe. A primary activation arrangement is configured to move the seal unit from the first configuration to the second configuration, and a secondary activation arrangement is configured to apply a force on an activating member of the primary activation arrangement to maintain the seal unit in the second, retracted, configuration.

In use, the isolation tool is locatable in a section of the pipe through a single opening in the wall of the pipe, in particular, but not exclusively, via a hot tap connection or the like. The primary activation arrangement then reconfigures the seal unit from the first configuration to the second configuration to urge the seal arrangement into sealing or enhanced sealing engagement with the pipe. The secondary activation arrangement then applies a force to the activation member of the primary activation arrangement to maintain the seal unit in the second, retracted, configuration.

Beneficially, the isolation tool is configured so that once the primary activation arrangement has reconfigured the seal unit to the second configuration, the self-energization of the seal arrangement maintains the isolation even if the primary activation force is removed or lost. Moreover, the isolation tool is configured so that the secondary activation arrangement provides the ability to maintain the isolation in the event of total loss of the primary activation arrangement in pipeline applications where the differential pressure is below a set load force required to activate the self-energization capability of the seal arrangement.

The secondary activation arrangement may be independently operable of the primary activation arrangement, as described below.

The isolation tool may be configured, e.g., shaped, dimensioned and/or arranged, to be inserted into the pipe through a hot tap or the like, or through an established or existing branch, tee or opening.

In particular, the isolation tool may be configured for location in a downstream section of the pipe to be isolated.

When used herein, the terms "upstream" and "outboard" are intended to indicate the higher pressure side of an isolation tool, and the terms "downstream" and "inboard" intended to indicate the lower pressure side, which will typically be the side oriented towards an isolated section of pipe.

Beneficially, the ability to locate the seal unit downstream of the penetration or opening allows fluid to flow from the upstream section of the pipe and through the penetration or opening, i.e., it is possible to utilise the penetration as a flow path. This allows, for example, bypass flow from the upstream section of pipe to a point in the pipe beyond the isolated pipe section.

The isolation tool may be configured to pivot the seal unit into the section of the pipe to be isolated. The isolation tool may include an anchor for supporting the seal unit relative to a tee or branch which is fixed relative to the pipe. The anchor may include a pair of clevis arms. The seal unit may be pivotally mountable to the anchor. The seal unit may be pivotally mountable to the anchor via a linkage arrangement.

For example, the seal unit may be pivotally mounted to the anchor via a hinge pin and padeye arrangement. However, it will be understood that other linkage arrangements for pivotably mounting the seal unit to the anchor may be used.

As described above, the seal unit is reconfigurable from a first, axially extended, configuration to a second, axially retracted, configuration, movement of the seal unit to the second, axially retracted, configuration urging the seal arrangement towards the pipe wall so as to isolate the section of the pipe. The seal unit may include a mandrel. The mandrel may be coupled to the anchor via the linkage arrangement. The mandrel may define or may be fixedly coupled to a pressure head arranged to be exposed to downstream pressure ("downstream pressure head"). The activating member may be mounted on the mandrel.

The activating member may be configured to be translated relative to the mandrel to compress or otherwise activate the seal elements. In particular embodiments, the activating member may be configured to be translated relative to the mandrel in a downstream direction to compress or otherwise activate the seal elements. The activating member may define a pressure head ("upstream pressure head") configured to be exposed to upstream fluid pressure in the pipe.

In use, upstream fluid pressure in the pipeline act on the upstream pressure head.

Beneficially, the isolation tool is configured so that once activated by the primary activation arrangement, upstream pressure in the pipeline acts on the upstream pressure head to maintain the isolation.

The differential pressure between the upstream pressure in the pipeline and downstream fluid pressure applies a load force to the upstream pressure head equivalent to the differential pressure multiplied by the cross-sectional area of the pressure head. This load acts in parallel to the initial actuation to further energize the seal arrangement. The load is balanced by the seal element rubber pressure which, as it is acting across a smaller cross sectional area, generates a rubber pressure in excess of the pressure differential acting across the seal unit. This effect is known as self-energization and will maintain the seal energization independently of the primary activation arrangement.

As described above, the activating member forms part of the primary activation arrangement of the isolation tool. The primary activation arrangement may include or take the form of a fluid-powered activation arrangement. The activation member of the primary activation arrangement may include or take the form of a piston. In particular, the primary activation arrangement may include or take the form of a hydraulic activation arrangement.

However, it will be understood that the primary activation arrangement may alternatively or additionally include any fluid-powered activation arrangement, e.g., a pneumatic activation arrangement, and/or a mechanical activation arrangement. The primary activation arrangement may include a chamber.

The chamber may be disposed between and/or defined by the upstream pressure head and the mandrel. In use, the chamber receives fluid, in particular hydraulic fluid, which causes the activating member to translate relative to the mandrel and activate the seal arrangement.

As described above, the isolation tool includes a secondary activation arrangement configured to engage and apply a force on an activating member of the primary activation arrangement to maintain the seal unit in the second, retracted, configuration. The secondary activation arrangement may include or take the form of a fluid-powered activation arrangement. In particular, the secondary activation arrangement may include or take the form of a hydraulic activation arrangement. However, it will be understood that the secondary activation arrangement may alternatively or additionally include any fluid-powered activation arrangement, e.g., a pneumatic activation arrangement, and/or a mechanical activation arrangement.

The secondary activation arrangement may include an activating member ("secondary activating member"). The secondary activating member may include or take the form of a piston. The secondary activating member may be disposed on the mandrel. The secondary activating member may be axially movable relative to the mandrel. In particular embodiments, the secondary activating member is a separate member to the upstream pressure head. The secondary activating member may be interposed between the upstream pressure head and the anchor. In particular, the secondary activating member may be interposed between the upstream pressure head and the linkage arrangement. Alternatively, the secondary activating member may be integrally formed with the upstream pressure head. The secondary activation arrangement may include a chamber.

The chamber may be disposed between and/or defined by the secondary activating member, the mandrel and the linkage arrangement. In use, the chamber receives fluid, in particular hydraulic fluid, which causes the secondary activating member to be urged towards the upstream pressure head.

In particular embodiments, the secondary activating member may be translated into engagement with the upstream pressure head, the fluid in the chamber acting to maintain the upstream pressure head and thus the seal unit in the second, axially retracted, configuration.

Alternatively, the secondary activating member may be engaged with, or may form part of the upstream pressure head, the fluid in the chamber acting to maintain the upstream pressure head and thus the seal unit in the second, axially retracted, configuration.

In particular embodiments, the secondary activating member may define a stepped configuration. For example, an outboard portion of the secondary activating member may be disposed on a recess or shoulder of the linkage portion. In use, an end face of the outboard portion may be exposed to the upstream pressure. Beneficially, this acts to maintain the upstream pressure head and thus the seal unit in the second, axially retracted, configuration.

In particular embodiments, the seal arrangement includes at least two seal elements.

Alternatively, the seal arrangement may include a single seal element. The seal element(s) may be annular. The seal element(s) may be disposed around the mandrel. In particular embodiments, the seal element(s) are disposed on a body portion of the seal unit.

However, where the pipe geometry does not facilitate a two seal element seal unit, for example for smaller diameter pipe applications, the isolation tool may include two single seal element seal units. The single seal element seal units may be deployable via separate hot tap penetrations. The testing capability and level of isolation will be the same as for the two seal element seal unit.

The body portion may be integrally formed with the mandrel and/or downstream pressure head. Alternatively, the body portion may include a separate component. Alternatively, the seal elements may be disposed on the upstream pressure head. The seal elements may be interposed between the upstream pressure head and the downstream pressure head. In use, movement of the upstream pressure head towards the downstream pressure head compresses the seal elements. At least one of the seal elements includes an elastomeric seal. At least one of the seal elements may include a compression seal, that is a seal that is set or energized by compressing the seal. In use, compression of the seal elements results in radial expansion of the seal elements into sealing engagement or enhanced sealing engagement with the pipe. In particular, both seal elements include compression seals. The seal elements may be axially spaced on the mandrel. The seal elements may be axially spaced on the mandrel so as to define a chamber therebetween.

A port may be provided through the body portion so as to permit access to the chamber between the seal elements.

In use, the chamber is configured to receive a test pressure. Beneficially, the provision of a chamber permits the integrity of the isolation to be tested and/or monitored. Alternatively or additionally, the provision of a chamber permits the isolation tool to be utilized as a weld test tool.

At least one of the seal elements may be capable of sealing the section of pipe. In particular, either of the seals may be capable of resisting the full differential pressure between the pressurized or upstream portion of the pipe and the isolated or downstream portion of the pipe.

At least one of the seal elements may be a bi-directional seal. Accordingly, either or both of the seal elements may provide full sealing capability. Where a bi-directional element is used, this isolation tool can resist downstream pressure and can be used to pressure test the isolated section once the repair or modification is complete.

The seal elements may be adapted to be compliant to the pipe surface. Thus, seal integrity may be maintained where the inner surface of the pipe is irregular or has been subject to damage.

In particular embodiments, a predominant proportion of the load generated on the seal unit by the pipe or differential pressure is transmitted through the seal unit to the seal elements. Thus, as the cross-sectional area of the seal elements is less than the pipe cross-sectional area and of the seal unit, the pressure transmitted through the seal elements is greater than the pipe pressure, thus preventing bypass of fluid around the seal and assisting in prevention of explosive decompression of the seal.

The seal elements may be adapted to be initially compressed to provide at least initial isolation of the pipe. This is advantageous in particular where the isolation tool is used in lower pressure applications.

At least one of the seal elements may be provided with one or more anti-extrusion springs. Thus, the seal member is prevented from extruding when exposed to high differential pressures or high compressive loads.

The isolation tool may include a tongue, wheel or ball coupled to the seal unit. The wheel or ball may be configured to engage the wall of the pipe. Beneficially, the tongue, wheel or ball may assist in pivoting of the seal unit on entry into the pipe and/or assist in progression of the seal unit along the wall of the pipe.

According to a second aspect, there is provided an isolation tool assembly including a launcher configured to deploy and/or retrieve an isolation tool from a pipe through a single opening in the pipe, an adapter arrangement for coupling the isolation tool to the launcher, and an isolation tool for isolating a section of the pipe. The isolation tool includes a primary activation arrangement configured to move the seal unit from a first configuration to a second configuration, movement of the seal unit to the second configuration urging the seal arrangement towards the pipe wall so as to isolate the section of the pipe.

Beneficially, the isolation tool assembly permits a standard line stop launcher, deployment cylinder and yoke to be used in combination with improved isolation tools, reducing or eliminating the need for bespoke deployment equipment. The isolation tool may include a seal unit configured for location in a section of a pipe via a single opening in the wall of the pipe. The seal unit may include a seal arrangement configured to engage the wall of the pipe to isolate the section of the pipe.

In particular embodiments, the seal arrangement include at least two seal elements. Alternatively, the seal arrangement may include a single seal element. The seal elements may be self-energized by the isolated pressure differential across the seal unit.

The first configuration may be an axially extended configuration and the second configuration may be an axially retracted configuration, and movement of the seal unit to the second, axially retracted, configuration urges the seal arrangement towards the pipe wall so as to isolate the section of the pipe.

The isolation tool may take the form of the isolation tool of the first aspect and include a secondary activation arrangement configured to apply a force on an activating member of the primary activation arrangement to maintain the seal unit in the second, retracted, configuration.

The isolation tool may include a tongue, wheel or ball coupled to the seal unit. The wheel or ball may be configured to engage the wall of the pipe. Beneficially, the tongue, wheel or ball may assist in pivoting of the seal unit on entry into the pipe and/or assist in progression of the seal unit along the wall of the pipe. The isolation tool may be configured, e.g., shaped, dimensioned and/or arranged, to be inserted into the pipe through a hot tap or the like, or through an established or existing branch, tee or opening. In particular, the isolation tool may be configured for location in a downstream section of the pipe to be isolated. The isolation tool may be configured to pivot the seal unit into the section of the pipe to be isolated. The isolation tool may include an anchor for supporting the seal unit relative to a tee or branch which is fixed relative to the pipe.

The anchor may include a pair of clevis arms. The seal unit may be pivotally mountable to the anchor. The seal unit may be pivotally mountable to the anchor via a linkage arrangement. For example, the seal unit may be pivotally mounted to the anchor via a hinge pin and padeye arrangement. However, it will be understood that other linkage arrangements for pivotably mounting the seal unit to the anchor may be used.

The primary activation arrangement may include or take the form of a fluid-powered activation arrangement. The activation member of the primary activation arrangement may include or take the form of a piston. In particular, the primary activation arrangement may include or take the form of a hydraulic activation arrangement.

However, it will be understood that the primary activation arrangement may alternatively or additionally include any fluid-powered activation arrangement, e.g., a pneumatic activation arrangement, and/or a mechanical activation arrangement.

The primary activation arrangement may include a chamber. The chamber may be disposed between and/or defined by the upstream pressure head and the mandrel. In use, the chamber receives fluid, in particular hydraulic fluid, which causes the activating member to translate relative to the mandrel and activate the seal arrangement.

The isolation tool assembly may be configured so that, once in location, the setting of the seal elements of the isolation tool will generate high seal pressure and centralise the seal unit.

Alternatively, the isolation tool may take the form of the isolation tool described in Applicant's EP 2320120 B, the contents of which are incorporated by reference.

The launcher may include a launcher housing. The launcher may include a piston and cylinder arrangement. The launcher may include a yoke. The yoke may be coupled to the piston of the piston and cylinder arrangement. The yoke may form an anchor for the isolation tool. The yoke may be coupled to the isolation tool. In use, extension of the piston relative to the cylinder may deploy the isolation tool into the pipe. The launcher may include one or more umbilical for supplying fluid, e.g., hydraulic fluid, to the isolation tool. In embodiments where the isolation tool includes the secondary activation arrangement, the launcher may include an additional fluid line for supplying fluid to the secondary activation arrangement.

An extension spool may be provided, where required due to the extra length of the assembly compared to conventional tooling.

The adapter arrangement may include an offset arm. The offset arm may be configured to connect the isolation tool to the yoke of the launcher.

A piston rod extension may be provided. Beneficially, the piston rod extension facilitates the use of the conventional launcher without requiring modification to the stroke of the piston and cylinder arrangement.

The assembly may include one or more guide pin to hold the isolation tool assembly straight during deployment.

It will be recognized that the launcher and yoke may take a number of different forms, and the adapter may be adapted to the specific launcher and/or yoke.

The isolation tool provides a number of significant benefits over conventional tools and equipment. For example, the isolation tool assembly is configured so that, once in location, the setting of the seal elements of the isolation tool will generate high seal pressure and centralise the seal unit. The isolation tool assembly is also configured so that the load at the hinge pin will be along the same vectors as with conventional line stop tooling, but slightly reduced load due to the seal friction from the compressed seals on the isolation tool seal unit. Since the isolation tool involves less working loads, the yoke will be less stressed than in conventional tooling.

The cylinder loading will also be the same as for conventional tooling, other than removing the risk of a snatch loading when the seal unit fully rotates.

A third aspect relates to use of the isolation tool of the first aspect to isolate a section of a pipe.

A fourth aspect relates to use of the isolation tool assembly of the second aspect to isolate a section of a pipe.

The method may include positioning the seal unit in the pipe downstream of the penetration, activating the seal elements using a primary activation mechanism to engage the pipe wall, and maintaining activation of the seal elements using a secondary activation mechanism.

The method may further include the step of rotating the seal unit after insertion into the pipe to align the seal elements with the pipe axis.

The method may further include the step of forming an opening in a wall of a pipe, which may be achieved by hot tapping.

The method may include removing the isolation tool from the pipe via the opening in the pipe, e.g., via the hot tap connection.

The method of the invention may further include the step of applying an elevated pressure to a chamber between the seal elements to test the pressure integrity of both seal elements.

It will be understood that reference to the term pipe includes any tubular construction including an oil or gas pipeline, whether subsea, above or below ground, downhole tubing, or indeed any other tubular suitable for transport or storage of fluids.

It will also be understood that for the purposes of the present disclosure the features defined above or described below may be utilized in isolation or in combination. The invention is defined by the appended claims.

BRIEF DESCRIPTION OF THE DRAWINGS

These and other aspects of the present invention will now be described, by way of example only, with reference to the accompanying drawings, in which.

DETAILED DESCRIPTION OF THE DESCRIPTION

Figure 1:
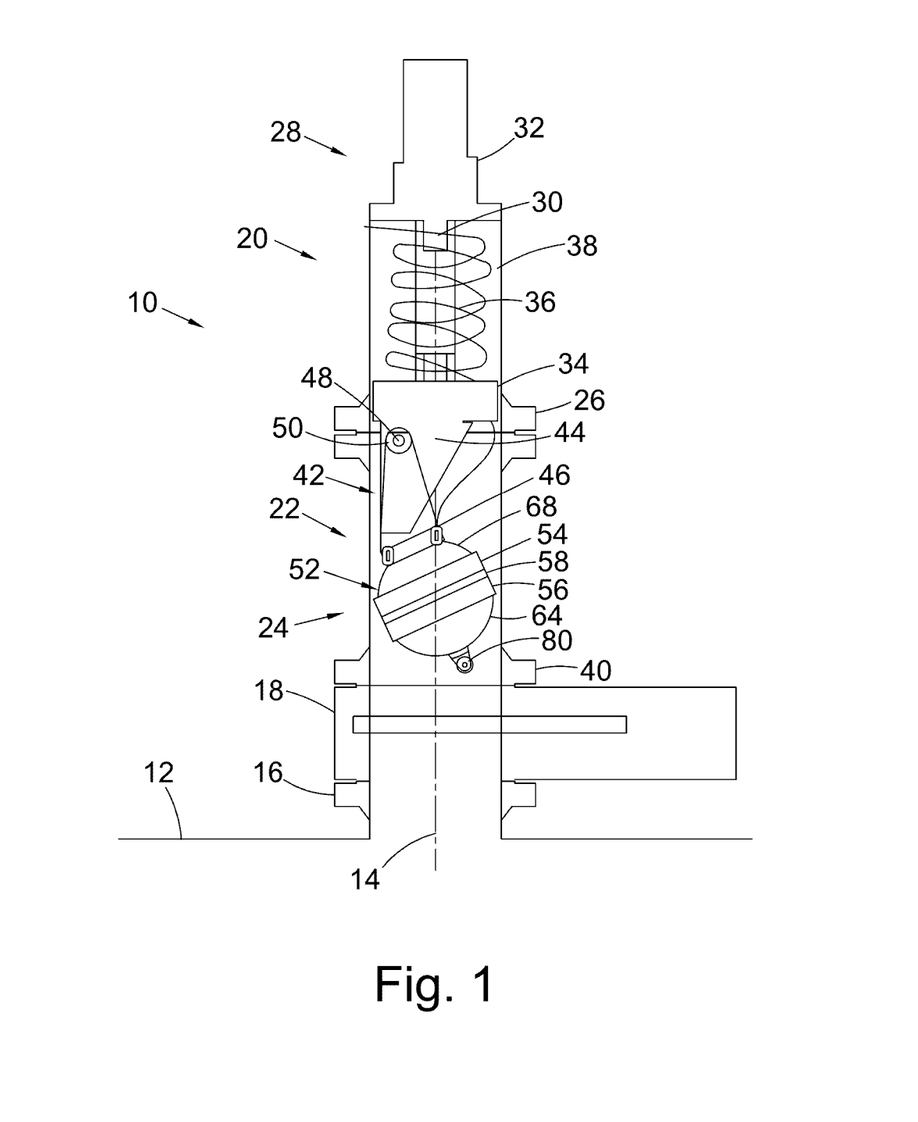
FIG. 1 shows an isolation tool assembly according to a first embodiment.

Referring first to FIG. 1 of the accompanying drawings, there is shown an isolation tool assembly 10 according to a first embodiment.

As shown in FIG. 1, the isolation tool assembly 10 is shown connected to a section of a pipe 12. An opening 14 has been formed through the wall of the pipe 12 by hot tapping or other suitable process and a tee or branch connection 16 has been added. As shown, access through the opening 14 is controlled by a valve 18.

The isolation tool assembly 10 includes a launcher 20, an adapter arrangement 22 and an isolation tool 24.

The launcher 20 is configured to deploy and/or retrieve the isolation tool 24 from the pipe 12 through the single opening 14. In the illustrated assembly 10, the launcher 20 includes a launcher housing 26, a piston and cylinder arrangement, generally denoted 28, including a piston 30 and a cylinder 32, and a yoke 34.

Figure 2:
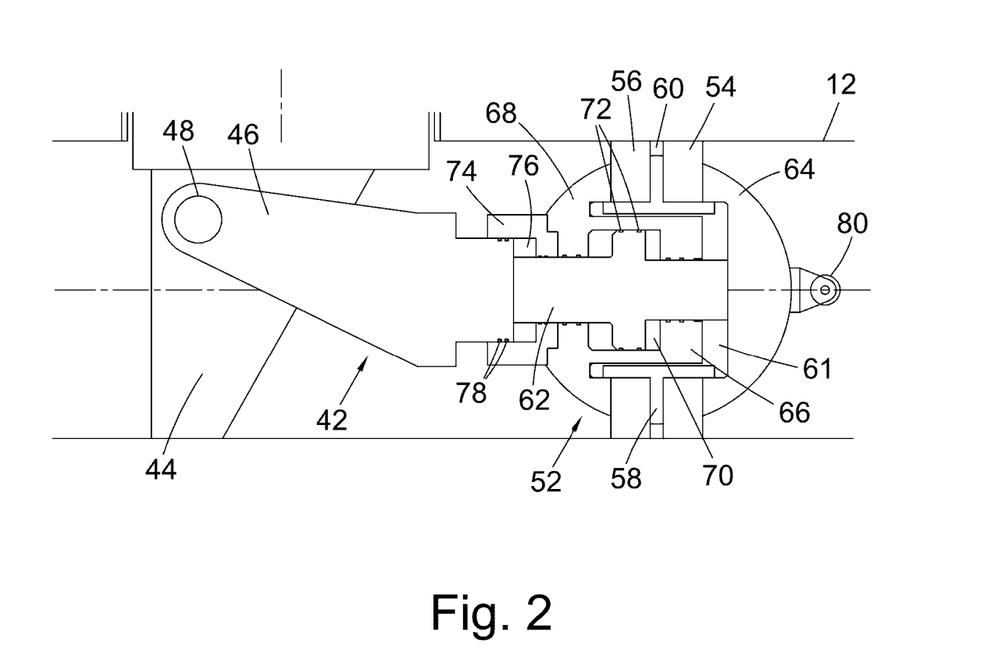
FIG. 2 shows an enlarged view of the isolation tool of the isolation tool assembly shown in FIG. 1.

As shown in FIG. 1, the yoke 34 is coupled to the piston 30 of the piston and cylinder arrangement 28 via a piston rod extension 36. In use, extension of the piston 30 relative to the cylinder 32 moves the yoke towards the pipe 12 and deploys the isolation tool 24 into the pipe 12 (to the position as shown in FIG. 2). Beneficially, the piston rod extension 36 facilitates the use of a conventional launcher without requiring modification to the stroke of the piston and cylinder arrangement 28.

As shown in FIG. 1, an umbilical 38 is provided in order to supply activation fluid to the isolation tool 24. In the illustrated assembly 10, the umbilical 38 is configured to supply activation fluid in the form of hydraulic fluid to the isolation tool 24.

In the illustrated assembly 10, and as will be described further below, the isolation tool 24 includes independent primary and secondary activation arrangements and so the umbilical 38 includes two hydraulic supply lines (not shown). While in the illustrated assembly 10, both hydraulic supply lines are provided within the umbilical 38, the supply lines may alternatively be provided separately. An extension spool may be provided, where required due to the extra length of the assembly 10 compared to conventional tooling.

As shown in FIG. 1, the adapter arrangement 22 is configured to couple the launcher 20 to the pipe 12 via adapter housing 40 and the isolation tool 24 to the yoke 34 via a linkage arrangement, generally denoted 42. In the illustrated assembly 10, the yoke 34 includes a pair of clevis arms 44 and forms an anchor for the isolation tool 24.

The linkage arrangement 42 includes an offset arm 46. The arm 46 is pivotably coupled to the yoke 34 via hinge pin 48 and padeye 50.

The assembly 10 includes one or more guide pin (not shown) to hold the isolation tool 24 straight during deployment.

As shown in FIG. 1 and referring now also to FIG. 2 of the accompanying drawings, the isolation tool 24 includes a seal unit in the form of a spherical seal module 52.

The seal module 52 includes annular primary and secondary seal elements 54, 56 disposed on body 58. A chamber 60 (shown in FIG. 2) is disposed between the seal elements 54, 56 and a fluid line (not shown in the drawing) extends from the chamber 60 to a tool control unit (not shown). In use, a test pressure can be applied to the chamber 60 between the seal elements 54, 56. Beneficially, the provision of a chamber 60 permits the integrity of the isolation to be tested and/or monitored.

In the illustrated isolation tool 24, the seal elements 54, 56 take the form of elastomeric compression seals and the seal module 52 is reconfigurable from a first, axially extended, configuration to a second, axially retracted, configuration, movement of the seal module 52 to the second, axially retracted, configuration urging the seal elements 54, 56 towards the wall of the pipe 12 so as to isolate the section of the pipe 12.

As shown in FIG. 2, the seal module 52 includes a mandrel 62, the mandrel 62 coupled to the yoke 34 via the linkage arrangement 42.

The mandrel 62 is fixedly coupled to a pressure head (downstream pressure head 64) arranged to be exposed to downstream pressure.

An activating member 66 is mounted on the mandrel 62, the activating member 66 in the illustrated isolation tool 24 taking the form of a piston configured to be translated in a downstream direction relative to the mandrel 62 to compress or otherwise activate the seal elements 54, 56.

The activating member 66 defines a pressure head (upstream pressure head 68) configured to be exposed to upstream fluid pressure in the pipe 12.

In use, upstream fluid pressure in the pipe 12 act on the upstream pressure head 68.

Beneficially, the isolation tool 24 is configured so that once activated by the primary activation arrangement, upstream pressure in the pipe 12 acts on the upstream pressure head 68 to maintain the isolation provided by the seal elements 54, 56.

The differential pressure between the upstream pressure in the pipe 12 and downstream fluid pressure applies a load force to the upstream pressure head 68 equivalent to the differential pressure multiplied by the cross sectional area of the pressure head 68. This load acts in parallel to the initial actuation to further energise the seal elements 54, 56. The load is balanced by the seal element rubber pressure which, as it is acting across a smaller cross sectional area, generates a rubber pressure in excess of the pressure differential acting across the seal module 52. This effect is known as self-energization and will maintain the seal energization independently of the primary activation arrangement.

As described above, the activating member 66 forms part of the primary activation arrangement of the isolation tool 24 and in the illustrated isolation tool 24 the primary activation arrangement takes the form of a fluid-powered activation arrangement, more particularly a hydraulic activation arrangement.

As shown in FIG. 2, a chamber 70 is disposed between the activating member 66 and the mandrel 62. The chamber 70 is sealed by seal elements 72 which in the illustrated isolation tool 24 take the form of o-ring seal elements, although other suitable seal elements may be provided. In use, the chamber 70 receives hydraulic fluid from a first flow line of the umbilical 38 which causes the activating member 66 to translate relative to the mandrel 62 and activate the seal elements 54, 56.

In the illustrated isolation tool 24, the tool 24 includes a secondary activation arrangement configured to engage and apply a force on the activating member 66 of the primary activation arrangement to maintain the seal module 52 in the second, retracted, configuration.

The secondary activation arrangement takes the form of a fluid-powered activation arrangement, more particularly a hydraulic activation arrangement and includes an activating member (secondary activating member 74).

As shown in FIG. 2, the secondary activating member 74 is disposed on and axially moveable relative to the mandrel 62 and in the illustrated isolation tool 24 takes the form of a piston.

The secondary activating member 74 is interposed between the upstream pressure head 68 and the linkage arrangement 42.

A chamber 76 is disposed between and defined by the secondary activating member 74, the mandrel 62 and the linkage arrangement 42. The chamber 74 is sealed by seal elements 78 which in the illustrated isolation tool 24 take the form of o-ring seal elements, although other suitable seal elements may be provided. In use, the chamber 76 receives hydraulic fluid from a second flow line of the umbilical 38 which causes the secondary activating member 74 to be urged towards the upstream pressure head 68.

As shown in FIG. 2, an offset wheel 80 is disposed on the distal end of the seal module 52, the wheel 80 configured to engage the wall of the pipe 12. Beneficially, the wheel 80 assists in pivoting of the seal module 52 on entry into the pipe 12 and/or assist in progression of the seal module 52 along the wall of the pipe 12.

In use, the tool assembly 10 is assembled by connecting the seal module 52 to the yoke 34 using the linkage arrangement 42, connecting the piston and cylinder arrangement 28 to the launcher housing 26 and, where required, reconfiguring the piston and cylinder arrangement 28 so that the piston 30 is exposed. The adapter housing 40 is then connected to the launcher housing 26. The piston rod extension 36 is then connected to the piston 30 with line stop pins (not shown). The hydraulic umbilical 38 is coiled inside the launcher housing 26, through a ported blind flange on a vent port (not shown). The yoke 34 is then connected to the piston rod extension 36 and the hydraulic umbilical 38 connected to the seal module 52. The seal module 52 is then retracted into the adapter housing 26.

During operation, the isolation tool assembly 10 is connected onto the hot tap valve 18 after the hot tap has been completed. The valve 18 is then opened and the piston and cylinder arrangement 28 operated to deploy the yoke 34 and the pivotably connected seal module 52 into the pipe 12. In the illustrated isolation tool assembly 10, once the offset wheel 80 contacts the bottom of the pipe 12, the seal module 52 will start to rotate.

Deployment continues until the yoke 34 contacts the bottom of the pipe 12. It is notable that the seal module 52, when unset, has approximately 5% radial clearance so can be deployed into flow with no risk of the seal module 52 snatching.

The primary activation arrangement is then activated by supplying hydraulic fluid to the chamber 70, causing the seal module 52 to be reconfigured from the first, axially extended, configuration shown in FIG. 1 to the second, axially retracted, configuration shown in FIG. 2. As described above, axial retraction of the seal module 52 causes the activating member 66 to translate relative to the mandrel 62 and activate the seal elements 54, 56 by axial compression of the seal elements 54, 56 by the pressure head 68.

Flow through the pipe 12 is thus stopped in a controlled manner.

Once flow through the pipe 12 has been stopped, the chamber 61 is vented, thereby generating a self-energising load on the seals 54, 56 and allowing both seals to be confirmed as leak tight. Where the pipeline pressure is sufficient (e.g., approximately 10 Bar) the seals 54, 56 will be self-energized so would remain intact even if the hydraulic set pressure to the chamber 70 is lost. In the illustrated isolation tool assembly 10, however, the hydraulic set pressure is nevertheless maintained in case of loss of pipeline pressure via the secondary activation arrangement.

It is notable that the illustrated assembly 10 permits fluid bypass through the opening, thus reducing or eliminating the need for additional penetrations in the pipe 12, and the associated risk, time and expense.

The isolated section of the pipe 12 is then vented and drained. While the assembly 10 reduces the requirement for additional penetrations into the pipe 12, venting and draining of the pipe 12 may be achieved efficiently and safely using one or more small bore hot taps.

Testing of the seals 54, 56 is performed by raising void 60 to higher than upstream pressure and locking in to test the secondary seal 56, then venting void 60 to ambient and locking in to test the primary seal 54. Thus, both seals are tested to the full pressure prior to breaching containment in the isolated section of the pipe 12.

During operation and in particular during "hot work," the chamber 60 between the seal elements 54, 56 can be monitored (locked in at ambient) as an assurance that no fluid (e.g., flammable hydrocarbons) is present. Alternatively, fluid e.g., nitrogen or water, may be supplied to the chamber 60 at higher pressure than the pipeline pressure, thereby providing a barrier.

Prior to unsetting, the pressure in the isolated section can be pressurized by an external port, or alternatively the seal module 52 can be unset by raising the body vent and annulus to pipeline pressure and hydraulically unsetting.

The piston 30 is then retracted to retrieve the seal module 52 into the adapter housing 40, the weight of the seal module 52 returning the module 52 to a vertical orientation and thus assisting in removal of the isolation tool 24.

Figure 3:
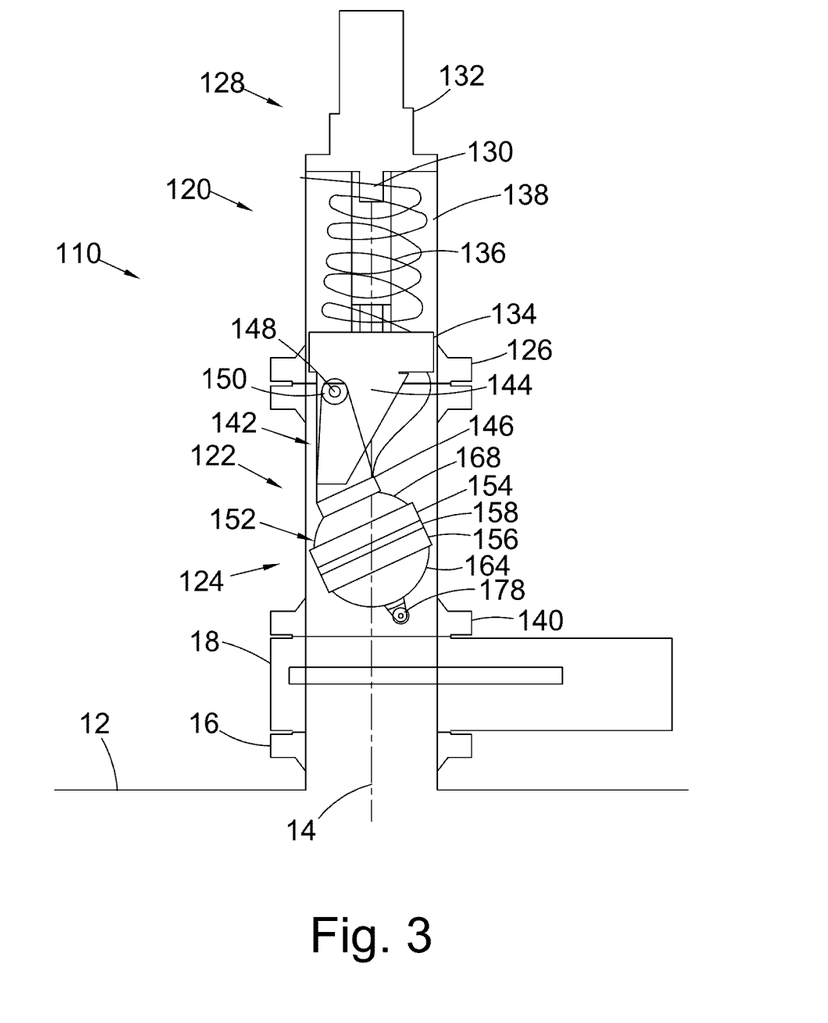
FIG. 3 shows an alternate isolation tool assembly.
Figure 4:
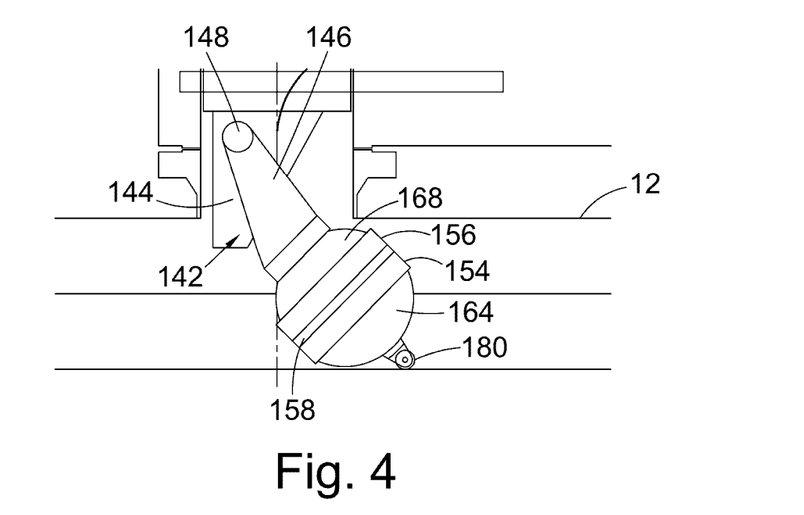
FIG. 4 shows an enlarged view of the isolation tool of the isolation tool assembly shown in FIG. 3, in the first configuration.
Figure 5:
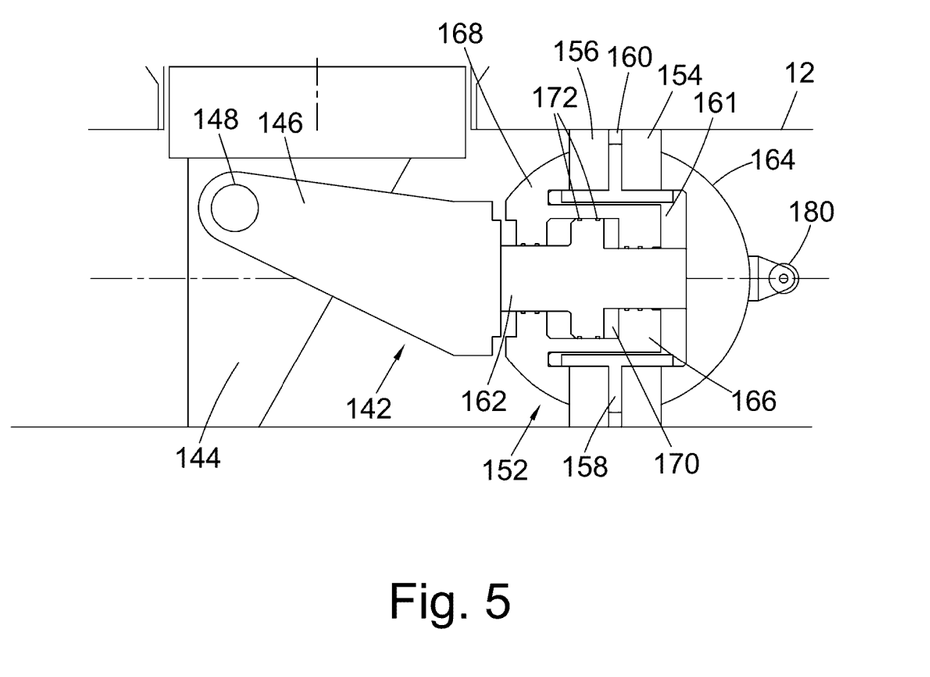
FIG. 5 shows an enlarged view of the isolation tool of the isolation tool assembly shown in FIG. 3, in the second configuration.

Referring now to FIGS. 3 to 5 of the accompanying drawings, there is shown an alternate isolation tool assembly 110. The isolation tool assembly 110 is similar to the isolation tool assembly 10 and like components are represented by like reference signs incremented by 100. However, as will be described further below, the isolation tool 124 of the isolation tool assembly 110 differs from the isolation tool assembly 10 in that the isolation tool 124 does not have a secondary activation arrangement utilising activating member 74 as described above, and thus of a similar configuration to that described in Applicant's EP 2320120 B.

As shown in FIG. 3, the isolation tool assembly 110 is shown connected to a section of a pipe 12. An opening 14 has been formed through the wall of the pipe 12 by hot tapping or other suitable process and a tee or branch connection 16 has been added. As shown, access through the opening 14 is controlled by a valve 18.

The isolation tool assembly 110 includes a launcher 120, an adapter arrangement 122, and an isolation tool 124.

The launcher 120 is configured to deploy and/or retrieve the isolation tool 124 from the pipe 12 through the single opening 14. In the illustrated assembly 110, the launcher 120 includes a launcher housing 126, a piston and cylinder arrangement, generally denoted 128, including a piston 130 and a cylinder 132, and a yoke 134.

As shown in FIG. 3, the yoke 134 is coupled to the piston 130 of the piston and cylinder arrangement 128 via a piston rod extension 136. In use, extension of the piston 130 relative to the cylinder 132 moves the yoke towards the pipe 12 and deploys the isolation tool 124 into the pipe 12 (as shown in FIGS. 4 and 5). Beneficially, the piston rod extension 136 facilitates the use of a conventional launcher without requiring modification to the stroke of the piston and cylinder arrangement 128.

As shown in FIG. 3, an umbilical 138 is provided in order to supply activation fluid to the isolation tool 124. In the illustrated assembly 110, the umbilical 138 is configured to supply activation fluid in the form of hydraulic fluid to the isolation tool 124.

As described above, unlike the assembly 10 which includes independent primary and secondary activation arrangements, the assembly 110 includes primary activation arrangement and so the umbilical 138 includes a single hydraulic supply line (not shown). An extension spool may be provided, where required due to the extra length of the assembly 110 compared to conventional tooling.

As shown in FIG. 3, the adapter arrangement 122 is configured to couple the launcher 120 to the pipe 12 via adapter housing 140 and the isolation tool 124 to the yoke 134 via a linkage arrangement, generally denoted 142. In the illustrated assembly 110, the yoke 134 includes a pair of clevis arms 144 and forms an anchor for the isolation tool 124.

The linkage arrangement 142 includes an offset arm 146. The arm 146 is pivotably coupled to the yoke 134 via hinge pin 148 and padeye 150.

The assembly 110 includes one or more guide pin (not shown) to hold the isolation tool 124 straight during deployment.

As shown in FIG. 3 and referring now also to FIGS. 4 and 5 of the accompanying drawings, the isolation tool 124 includes a seal unit in the form of a spherical seal module 152.

The seal module 152 includes annular primary and secondary seal elements 154, 156 disposed on body 158. A chamber 160 (shown in FIGS. 4 and 5) is disposed between the seal elements 154, 156 and a fluid line (not shown in the drawing) extends from the chamber 160 to a tool control unit (not shown). In use, a test pressure can be applied to the chamber 160 between the seal elements 154, 156. Beneficially, the provision of a chamber 160 permits the integrity of the isolation to be tested and/or monitored in a similar manner to that described above.

In the illustrated isolation tool 124, the seal elements 154, 156 take the form of elastomeric compression seals and the seal module 152 is reconfigurable from a first, axially extended, configuration to a second, axially retracted, configuration, movement of the seal module 152 to the second, axially retracted, configuration urging the seal elements 154, 156 towards the wall of the pipe 12 so as to isolate the section of the pipe 12.

As shown in FIGS. 4 and 5, the seal module 152 includes a mandrel 162, the mandrel 162 coupled to the yoke 134 via the linkage arrangement 142. The mandrel 162 is fixedly coupled to a pressure head (downstream pressure head 164) arranged to be exposed to downstream pressure.

An activating member 166 is mounted on the mandrel 162, the activating member 166 in the illustrated isolation tool 124 taking the form of a piston configured to be translated in a downstream direction relative to the mandrel 162 to compress or otherwise activate the seal elements 154, 156. The activating member 166 defines a pressure head (upstream pressure head 168) configured to be exposed to upstream fluid pressure in the pipe 12.

In use, upstream fluid pressure in the pipe 12 act on the upstream pressure head 168.

Beneficially, the isolation tool 124 is configured so that once activated by the primary activation arrangement, upstream pressure in the pipe 12 acts on the upstream pressure head 168 to maintain the isolation provided by the seal elements 154, 156.

The differential pressure between the upstream pressure in the pipe 12 and downstream fluid pressure applies a load force to the upstream pressure head 168 equivalent to the differential pressure multiplied by the cross sectional area of the pressure head 168. This load acts in parallel to the initial actuation to further energise the seal elements 154, 156. The load is balanced by the seal element rubber pressure which, as it is acting across a smaller cross sectional area, generates a rubber pressure in excess of the pressure differential acting across the seal module 152. This effect is known as self-energization and will maintain the seal energization independently of the primary activation arrangement.

As described above, the activating member 166 forms part of the primary activation arrangement of the isolation tool 124 and in the illustrated isolation tool 124 the primary activation arrangement takes the form of a fluid-powered activation arrangement, more particularly a hydraulic activation arrangement.

As shown in FIGS. 4 and 5, a chamber 170 is disposed between the upstream pressure head 168 and the mandrel 162. The chamber 170 is sealed by seal elements 172 which in the illustrated isolation tool 124 take the form of o-ring seal elements, although other suitable seal elements may be provided. In use, the chamber 170 receives hydraulic fluid from a first flow line of the umbilical 138 which causes the activating member 166 to translate relative to the mandrel 162 and activate the seal elements 154, 156.

As shown in FIGS. 4 and 5, an offset wheel 180 is disposed on the distal end of the seal module 152, the wheel 180 configured to engage the wall of the pipe. Beneficially, the wheel 180 assists in pivoting of the seal module 152 on entry into the pipe 12 and/or assist in progression of the seal module 152 along the wall of the pipe 12.

Assembly and operation of the tool assembly 110 is similar to the tool assembly 10. In use, the tool assembly 110 is assembled by connecting the seal module 152 to the yoke 134 using the linkage arrangement 142, connecting the piston and cylinder arrangement 128 to the launcher housing 126 and, where required, reconfiguring the piston and cylinder arrangement 128 so that the piston 130 is exposed. The adapter housing 40 is then connected to the launcher housing 126. The piston rod extension 36 is then connected to the piston 130 with line stop pins (not shown). The hydraulic umbilical 138 is coiled inside the launcher housing 126, through a ported blind flange on a vent port (not shown). The yoke 134 is then connected to the piston rod extension 136 and the hydraulic umbilical 138 connected to the seal module 152. The seal module 152 is then retracted into the adapter housing 126.

During operation, the isolation tool assembly 110 is connected onto the hot tap valve 18 after the hot tap has been completed. The valve 18 is then opened and the piston and cylinder arrangement 128 operated to deploy the yoke 134 and the pivotably connected seal module 152 into the pipe 12. In the illustrated isolation tool assembly 110, once the offset wheel 180 contacts the bottom of the pipe 12, the seal module 152 will start to rotate.

Deployment continues until the yoke 134 contacts the bottom of the pipe 12. As in the assembly 10, the seal module 152, when unset, has approximately 5% radial clearance so can be deployed into flow with no risk of the seal module 152 snatching.

The primary activation arrangement is then activated by supplying hydraulic fluid to the chamber 170, causing the seal module 152 to reconfigure from the first, axially extended, configuration shown in FIGS. 3 and 4 to the second, axially retracted, configuration shown in FIG. 5. As described above, axial retraction of the seal module 152 causes the activating member 166 to translate relative to the mandrel 162 and activate the seal elements 154, 156 by axial compression of the seal elements 154, 156 by pressure head 168.

Flow through the pipe 12 is thus stopped in a controlled manner Once flow through the pipe 12 has been stopped, the chamber 161 is vented, thereby generating a self-energizing load on the seals 154, 156 and allowing both seals to be confirmed as leak tight. Where the pipeline pressure is sufficient (e.g., approximately 10 Bar) the seals 154, 156 will be self-energized so would remain intact even if the hydraulic set pressure to the chamber 170 is lost.

As in the assembly 10, the illustrated assembly 110 permits fluid bypass through the opening 14, thus reducing or eliminating the need for additional penetrations in the pipe 12, and the associated risk, time and expense.

The isolated section of the pipe 12 is then vented and drained. While the assembly 110 reduces the requirement for additional penetrations into the pipe 12, venting and draining of the pipe 12 may be achieved efficiently and safely using one or more small bore hot taps.

Testing of the seals 154, 156 is performed by raising void 160 to higher than upstream pressure and locking in to test the secondary seal 156. Then venting void 160 to ambient and locking in to test the primary seal 154. Thus, both seals 154, 156 are tested to the full pressure prior to breaching containment in the isolated section of the pipe 12.

Prior to unsetting, the pressure in the isolated section can be pressurized by an external port, or alternatively the seal module 152 can be unset by raising the body vent and annulus to pipeline pressure and hydraulically unsetting.

The piston 130 is then retracted to retrieve the seal module 152 into the adapter housing 140, the weight of the seal module 152 returning the module 152 to a vertical orientation and thus assisting in removal of the isolation tool 124.

It will be apparent to those of skill in the art that the isolation tool, assembly and methods described herein provide a number of significant advantages over conventional tools and equipment and techniques.

For example, both assemblies 10, 110 provide for dual activation in the form of primary activation arrangement and self-energization and in the case of the isolation tool assembly 10 the assembly 10 provides for triple activation of the seal elements 54, 56 in a pipe 12 via the secondary activation arrangement. Both assemblies 10, 110 provide a double block and bleed isolation seal module through a single opening in the pipe and which can be retrofitted to conventional line stop assets. Moreover, the assemblies 10, 110 actually reduce the loading on the conventional assets. Both assemblies 10, 110 provide seal barriers which are both capable and tested to full isolated pressure. Both assemblies 10, 110 permit a chamber between the seal elements to be tested and/or monitored. Both assemblies 10, 110 provide stroke limitation on each seal element to ensure independence of barriers. Both assemblies 10, 110 provide a seal module which can be reconfigured from a radially retracted configuration to a radially extended configuration and so avoid snatch load in flow conditions.

It will also be understood that various modifications can be made without departing from the scope of the claimed invention.

For example, as described above the downstream deployment of the assemblies 10, 110 permits fluid bypass through the opening 14, thus reducing or eliminating the need for additional penetrations in the pipe 12, and the associated risk, time and expense and the adapter housing may be modified to provide a bypass connection.

Although the present invention has been described in relation to particular embodiments thereof, many other variations and modifications and other uses will become apparent to those skilled in the art.

The invention claimed is:

1. An isolation tool for use in isolating a section of a pipe, the isolation tool comprising:
    a seal unit configured for location in a section of the pipe via a single opening in a wall of the pipe, the seal unit comprising:
        a mandrel, and
        a seal arrangement configured to engage the wall of the pipe to isolate the section of the pipe, wherein the seal arrangement is self-energized by an isolated pressure differential across the seal unit, wherein the seal unit is reconfigurable from a first, axially extended, configuration to a second, axially retracted, configuration, and movement of the seal unit to the second, axially retracted, configuration urges the seal arrangement towards the wall of the pipe to isolate the section of the pipe;
    a primary activation arrangement configured to move the seal unit from the first configuration to the second configuration, wherein the primary activation arrangement comprises an activating member disposed on and axially moveable relative to the mandrel, and the activating member comprises or defines an upstream pressure head configured to be exposed to upstream fluid pressure in the pipe; and
    a secondary activation arrangement configured to apply a force on the activating member of the primary activation arrangement to maintain the seal unit in the second, axially retracted, configuration, wherein the secondary activation arrangement comprises or takes the form of a fluid-powered activation arrangement, the secondary activation arrangement comprising:
        an activating member disposed on and axially moveable relative to the mandrel, the activating member of the secondary activation arrangement comprising or taking the form of a piston, and
        a chamber configured to receive fluid which causes the activating member of the secondary activation arrangement to be urged towards the activating member of the primary activation arrangement.

2. The isolation tool of claim 1, wherein the secondary activation arrangement is operable independently of the primary activation arrangement.

3. The isolation tool of claim 1, wherein the isolation tool is configured to pivot the seal unit into the section of the pipe to be isolated.

4. The isolation tool of claim 1, comprising an anchor for supporting the seal unit relative to a tee or a branch which is fixed relative to the pipe.

5. The isolation tool of claim 4, wherein the seal unit is pivotally mountable to the anchor.

6. The isolation tool of claim 5, wherein the seal unit is pivotally mountable to the anchor via a linkage arrangement.

7. The isolation tool of claim 6, wherein the mandrel is coupled to the anchor via the linkage arrangement.

8. The isolation tool of claim 6, wherein the activating member of the secondary activation arrangement defines a stepped configuration, and wherein an outboard portion of the activating member of the secondary activation arrangement is disposed on a recess or shoulder of the linkage arrangement.

9. The isolation tool of claim 1, wherein the mandrel defines or is fixedly coupled to a pressure head arranged to be exposed to downstream pressure.

10. The isolation tool of claim 1, wherein the primary activation arrangement comprises or takes the form of a fluid-powered activation arrangement.

11. The isolation tool of claim 1, wherein the primary activation arrangement comprises a chamber disposed between and/or defined by the activating member of the primary activation arrangement and the mandrel.

12. The isolation tool of claim 1, wherein the seal arrangement comprises at least two seal elements.

13. An isolation tool assembly, comprising:
the isolation tool of claim 1;
a launcher configured to deploy and/or retrieve the isolation tool from the pipe through the single opening in the pipe; and
an adapter arrangement for coupling the isolation tool to the launcher.

14. The isolation tool assembly of claim 13, wherein the adapter arrangement comprises an offset arm, the offset arm being configured to connect the isolation tool to a yoke of the launcher.

15. A method of isolating a section of pipe using the isolation tool assembly of claim 13, the method comprising:
positioning the seal unit in the pipe downstream of the single opening,
activating the seal arrangement using the primary activation arrangement to engage the wall of the pipe, and
maintaining activation of the seal arrangement using the secondary activation arrangement.

16. A method of isolating a section of a pipe using the isolation tool of claim 1, the method comprising:
positioning the seal unit in the pipe downstream of the single opening,
activating the seal arrangement using the primary activation arrangement to engage the wall of the pipe, and
maintaining activation of the seal arrangement using the secondary activation arrangement.

17. An isolation tool for use in isolating a section of a pipe, the isolation tool comprising:
a seal unit configured for location in a section of the pipe via a single opening in a wall of the pipe, the seal unit comprising:
a mandrel,
a seal arrangement configured to engage the wall of the pipe to isolate the section of the pipe, wherein the seal arrangement is self-energized by an isolated pressure differential across the seal unit, wherein the seal unit is reconfigurable from a first, axially extended, configuration to a second, axially retracted, configuration, movement of the seal unit to the second, axially retracted, configuration urging the seal arrangement towards the wall of the pipe so as to isolate the section of the pipe,
an anchor for supporting the seal unit relative to a tee or branch which is fixed relative to the pipe, wherein the seal unit is pivotally mountable to the anchor via a linkage arrangement;
a primary activation arrangement configured to move the seal unit from the first configuration to the second configuration; and
a secondary activation arrangement configured to apply a force on an activating member of the primary activation arrangement to maintain the seal unit in the second, retracted, configuration, wherein the secondary activation arrangement comprises an activating member, the activating member of the secondary activation arrangement defining a stepped configuration, and wherein an outboard portion of the activating member of the secondary activation arrangement is disposed on a recess or shoulder of the linkage arrangement.

18. A method of isolating a section of a pipe using the isolation tool of claim 17, the method comprising:
positioning the seal unit in the pipe downstream of the single opening,
activating the seal arrangement using the primary activation arrangement to engage the wall of the pipe, and
maintaining activation of the seal arrangement using the secondary activation arrangement.

\* \* \* \* \*